United States Patent [19]

Seymour

[11] Patent Number: 4,910,947
[45] Date of Patent: Mar. 27, 1990

[54] CONDITIONING ROLL MOUNTING STRUCTURE

[75] Inventor: Shaun A. Seymour, New Holland, Pa.

[73] Assignee: Ford New Holland, Inc., New Holland, Pa.

[21] Appl. No.: 299,483

[22] Filed: Jan. 19, 1989

[51] Int. Cl.$^4$ .............................................. A01D 82/00
[52] U.S. Cl. .................................. 56/16.4; 56/DIG. 1
[58] Field of Search ....................... 56/16.4, 1, DIG. 1, 56/192; 100/176, 164, 155, 169, 171

[56] References Cited

U.S. PATENT DOCUMENTS

| | | | |
|---|---|---|---|
| 2,954,656 | 10/1960 | Koch et al. | 56/DIG. 1 X |
| 3,397,520 | 8/1968 | Johnston et al. | 56/DIG. 1 X |
| 3,431,710 | 3/1969 | Johnston | 56/DIG. 1 X |
| 3,488,929 | 1/1970 | Hale | 56/1 |
| 3,513,645 | 5/1970 | Garrett et al. | 56/1 |
| 4,035,991 | 7/1977 | Oosterling et al. | 56/1 |
| 4,516,392 | 5/1985 | McLean et al. | 56/16.4 |
| 4,808,015 | 2/1989 | Babcock | 384/42 X |

FOREIGN PATENT DOCUMENTS 2561857 10/1985 France .............................. 56/16.4

Primary Examiner—Hoang C. Dang
Attorney, Agent, or Firm—Larry W. Miller; Frank A. Seemar; Darrell F. Marquette

[57] ABSTRACT

A conditioning roll mounting structure is disclosed wherein the mounting shaft for the conditioning roll is permitted to be rotatably driven while permitted to reciprocate linearly transversely of the bearing apparatus. A bushing in the form of a support hub having an antifriction surface engaged with a non-circular conditioning roll mounting shaft is pressed within the inner race of a ball bearing whose outer race is secured to the frame of the hay harvesting machine. A drive mechanism can be attached to either the support hub or directly to the shaft provided that provisions are made for accommodating the transversely reciprocating roll movement. The structure permits the conditioning roll to be rotatably supported within the frame of the hay harvesting machine, while being capable of a linear movement between the non-circular conditioning roll mounting shaft and the support hub to which it is mounted. The non-circular mounting shaft can be in the form of splines or standard hexagonal configuration.

15 Claims, 5 Drawing Sheets

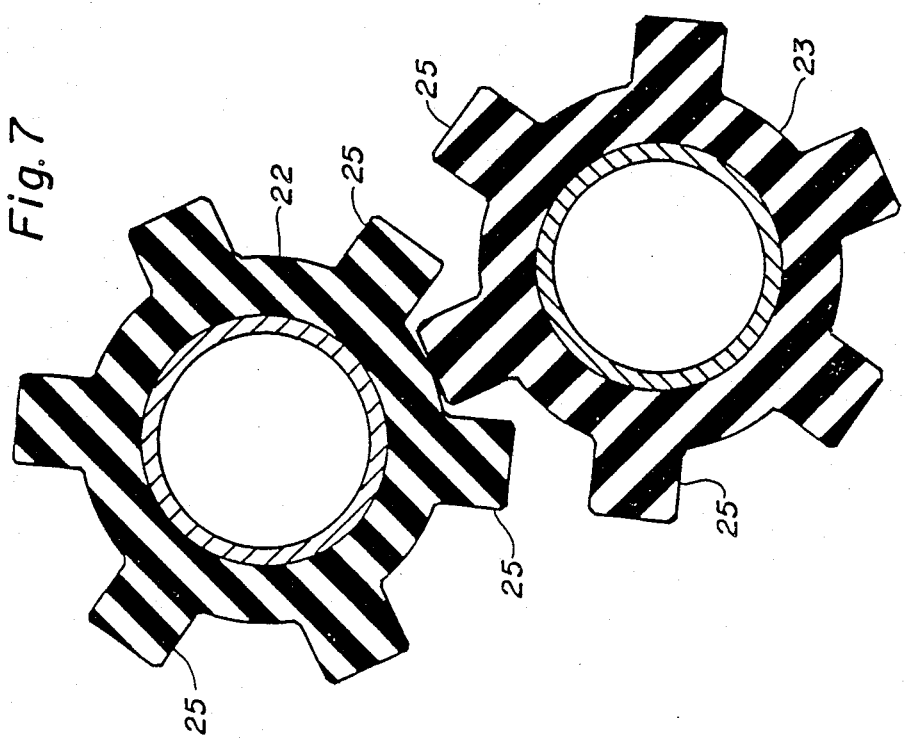
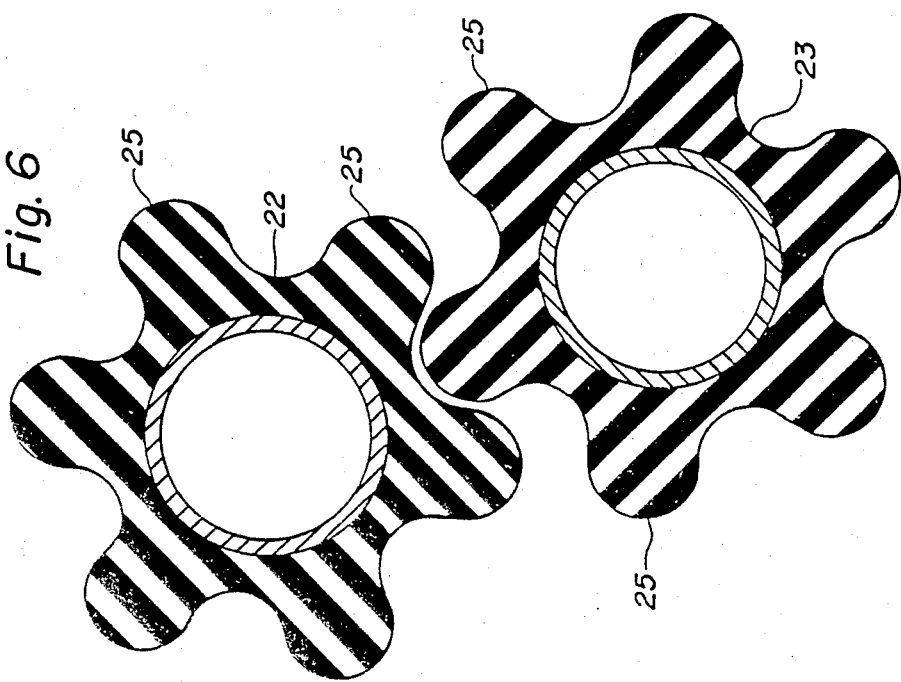

CONDITIONING ROLL MOUNTING STRUCTURE

BACKGROUND OF THE INVENTION

The present invention relates generally to hay harvesting machinery utilizing a conditioning mechanism and, more particularly, to a mounting structure to permit transverse reciprocating movement of a rotatably supported conditioning roll.

Hay harvesting machine commonly referred to as mower-conditioners or windrowers, utilize a crop harvesting header to sever the hay crop from the ground and convey it rearwardly to a conditioning mechanism operable to crush or crimp the severed crop material at spaced apart intervals along the stem of the crop to facilitate the drainage of liquids from the crop material plant. Conditioning mechanisms of the type utilizing a pair of counterrotating, intermeshing conditioning rolls are provided with transversely extending flutes to effect conditioning of the severed crop material in a manner described in greater detail in U.S. Pat. No. 3,488,929 issued to J. K. Hale.

Although the individual crop material plant, which generally has a waxy stem, has been broken in several places by the operation of the intermeshing flutes on the conditioning rolls, the liquids within the plant still require significant time to escape from the plant to permit satisfactory conditions in which the dried crop material can be baled and then removed from the field. A more rapid drying of liquids from the conditioned crop material could be obtained if the waxy stem of the crop material plant were split along the length thereof, providing a ready means for the liquid to escape from the plant.

One of the problems incurred with developing a reciprocating and rotating hay conditioning roll is to provide a mounting apparatus capable of accommodating both the rotational and transversely reciprocating linear movement of the conditioning roll. Further complications in the mounting structure would be to provide a cost effective bearing surface for both rotative add linear movements.

SUMMARY OF THE INVENTION

It is an object of this invention to overcome the aforementioned disadvantage of the prior art by providing a conditioning roll mounting apparatus capable of accommodating both rotative and transversely linear movements for a conditioning roll.

It is another object of this invention to provide a low cost bearing structure that will permit relative linear movement of a shaft along n axis perpendicular to the plane of rotation.

It is an advantage of this invention that the conditioning roll mounting apparatus can economically provide a means for rotatably supporting the conditioning roll while permitting axial transverse movement.

It is a feature of this invention that the conditioning roll is provided with a non-circular mounting shaft received within a corresponding bore bushing having an antifriction surface to permit axial movement relative therebetween.

It is another feature of this invention that the bushing is in the form of a support hub pressed into the inner race of a bearing whose outer race is fixed in the frame of the hay harvesting machine.

It is another advantage of this invention that the support hub and non-circular shaft mounted by the support hub are mounted for rotative movement relative to the frame of the hay harvesting machine.

It is still another feature of this invention that the support hub can effect a rotational driving of the mounting shaft for the conditioning roll because of the non-rotative engagement therebetween.

It is a further advantage of this invention that the non-circular mounting shaft for the reciprocating conditioning roll can be in the form of a standard hexagonal configuration or in the form of axially extending splines.

It is yet another object of this invention to provide a conditioning roll mounting apparatus capable of accommodating both rotative and linearly reciprocal movements on a conditioning roll, which is durable in construction, inexpensive of manufacture, carefree of maintenance, facile in assemblage, and simple and effective in use.

These and other objects, features and advantages are accomplished according to the instant invention by providing a conditioning roll mounting structure is disclosed wherein the mounting shaft for the conditioning roll is permitted to be rotatably driven while permitted to reciprocate linearly transversely of the bearing apparatus. A bushing in the form of a support hub having an antifriction surface engaged with a noncircular conditioning roll mounting shaft is pressed within the inner race of a ball bearing whose outer race is secured to the frame of the hay harvesting machine. A drive mechanism can be attached to either the support hub or directly to the shaft provided that provisions are made for accommodating the transversely reciprocating roll movement. The structure permits the conditioning roll to be rotatably supported within the frame of the hay harvesting machine, while being capable of a linear movement between the non-circular conditioning roll mounting shaft and the support hub to which it is mounted. The noncircular mounting shaft can be in the form of splines or standard hexagonal configuration.

BRIEF DESCRIPTION OF THE DRAWINGS

The advantages of this invention will become apparent upon consideration of the following disclosure of the invention, especially when taken in conjunction with the accompanying drawings wherein:

FIG. 6 is a schematic vertical crss-sectional view taken through the conditioning roll mechanism to represent a first embodiment of a conditioning roll profile; and FIG. 7 is a view similar to that shown in FIG. 6 depicting a second embodiment of the conditioning roll profile.

DETAILED DESCRIPTION OF THE PREFERRED EMBODIMENT

Figure 1:
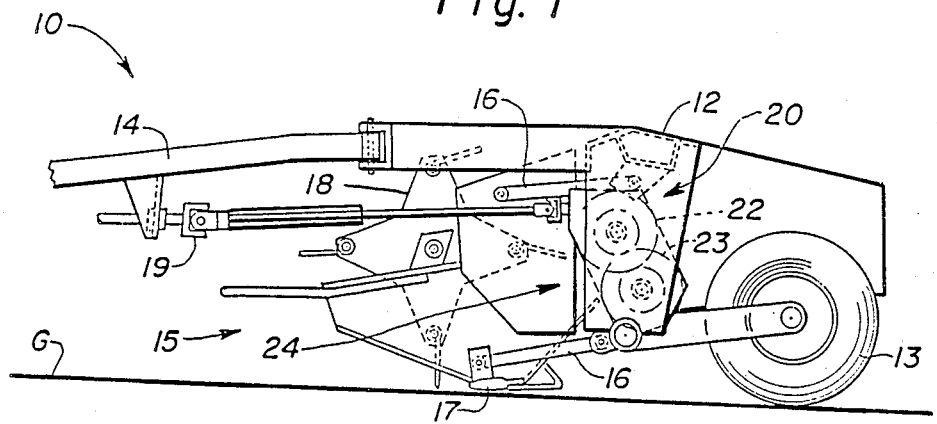
FIG. 1 is a side elevational view of a hay harvesting machine incorporating the principles of the instant invention.
Figure 2:
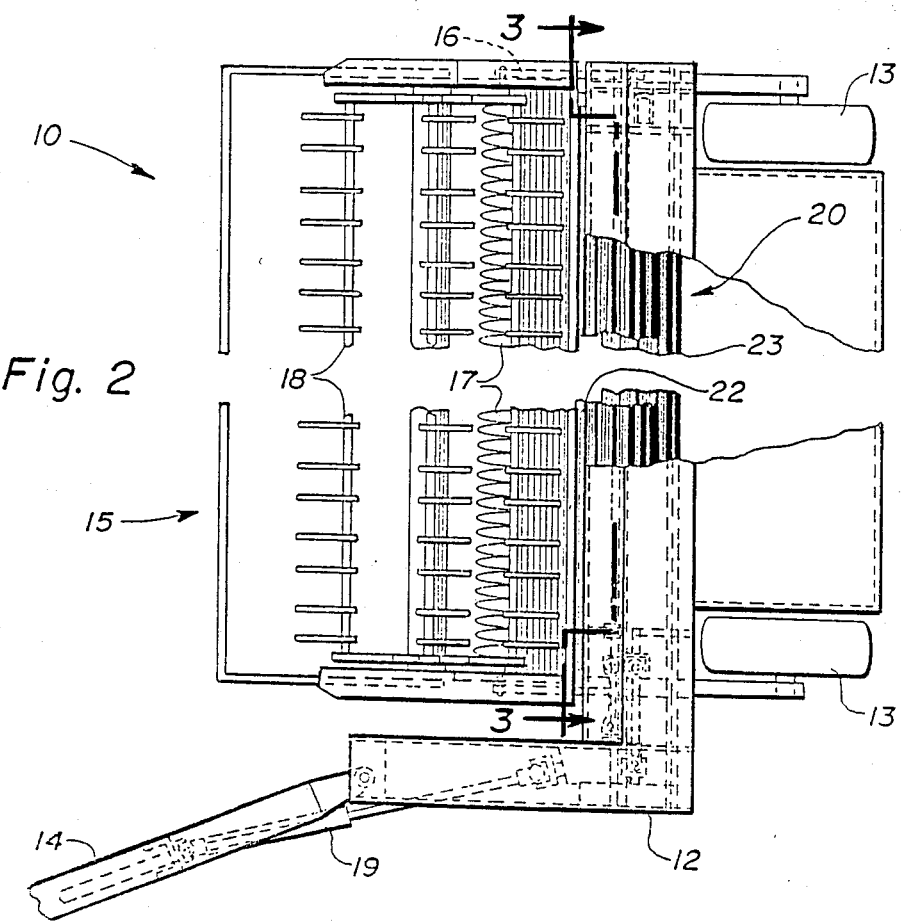
FIG. 2 is a top plan view of the hay harvesting machine seen in FIG. 1 with the center section thereof broken away for purposes of clarity.

Referring now to the drawings and, particularly, to FIGS. 1 and 2, a hay harvesting machine, commonly referred to as a pull-type mower-conditioner, incorporating the principles of the instant invention, can best be seen. Any left and right references are used as a matter of convenience and are determined by standing at the rear of the machine, facing the forward end, of the direction of travel.

The mower-conditioner 10 is provided with a frame 12 adapted for mobile movement over the ground G by wheels 13 rotatably mounted thereon. The frame 12 is provided with a pivotal draw bar 14 which extends forwardly therefrom for connection to a prime mover, such as a tractor, in a conventional manner. The frame 12 supports a header 15 by flotation linkage 16 for generally vertical movement relative to the ground G as is conventionally known. The header 15 includes a conventional cutter bar 17 operable to sever standing crop material from the ground G and a reel 18 rotatably operable in a conventional manner to convey the severed crop material rearwardly to the conditioning mechanism 20. The drive mechanism 19 is supported from the draw bar 14 and the frame 12 to transfer rotational power from the prime mover in a conventional manner to the operable components of the mower-conditioner 10.

The conditioning mechanism 20 is shown rotatably mounted in the frame 12 rearwardly of the header 15 to receive severed crop material conveyed rearwardly therefrom by the reel 18. The conditioning mechanism 20 is provided with an upper roll 22 and a counterrotating lower roll 23 positioned for intermeshing engagement therewith to define a throat 24 into which the severed crop material is fed so as to pass between the counterrotating conditioning rolls 22, 23. As depicted in Figs. 2, 6 and 7, each conditioning roll is provided with a plurality of circumferentially spaced flutes or lugs 25 extending transversely along the exterior surface of the conditioning rolls 22,23. The conditioning roll profile depicted in FIG. 6, due to the arcuate configuration of the individual intermeshing flutes 25, provide a substantially continuous crushing of the crop material as it passes through the throat 24 substantially tangential to the conditioning rolls 22, 23. Alternatively, the individual flutes 25 could have an angular shape as depicted in FIG. 7 so as to provide crimping points at the bends of the flutes 25 to effect a conditioning of the crop material passing through the throat 24 along substantially regular intervals as the crop material passes generally tangentially to the conditioning rolls 22, 23 in addition to the sliding conditioning action of the reciprocating conditioning rolls described in greater detail below.

To effect an even greater conditioning of the crop material passing through the throat 24 between the conditioning rolls 22, 23, at least one of the conditioning rolls 23 can be adapted for transverse linear movement relative to the other conditioning roll 22. While the drive mechanism 19 is causing a counterrotative movement of the respective conditioning rolls 22, 23, through the universal joint drive couplings 27, 29, an oscillating mechanism 30, shown in the form of a hydraulic cylinder 31 connected to the lower conditioning roll 23 by means of a thrust bearing 32, effects the transverse reciprocating movement of the lower conditioning roll 23. The lower conditioning roll 23 is provided with an outwardly extending axial shaft 33 which are rotatably mounted in the side sheets 34 of the frame 12 and extend outwardly therefrom in both directions for connection with the universal joint drive coupling 29 and the thrust bearing 32, respectively. The upper roll 22 is rotatably mounted in a pair of swing arms 36 operably associated with a conventional biasing mechanism (not shown) to urge the upper roll 22 into intermeshing engagement with the lower roll 23; however, the swing arms 36 permit the upper roll 22 to move away from the lower roll 23 within the slots 38 formed in the side sheets 34 to permit the passage of slugs or clumps of crop material through the throat 24.

Because of the transversely oriented intermeshed flutes 25 on the conditioning rolls 22, 23 and the relative sliding action created by the transversely linearly movable mower-conditioning roll 23, it is necessary that the drive to the conditioning rolls 22, 23 be timed to maintain the proper intermeshed relationship between the respective conditioning lugs 25. The reciprocal movement of the lower conditioning roll 23 is indicated by the phantom line adjacent the right side sheet 34. The transverse movement of the shaft 33 can be accommodated by the telescopical universal joint drive coupling 29 attached to the drive mechanism 19. The timing of the stroke of the hydraulic cylinder 31 is preferably automatically controlled either mechanically or through the means of a microprocessor to control the flow of hydraulic fluid to the hydraulic cylinder 31.

Figure 3:
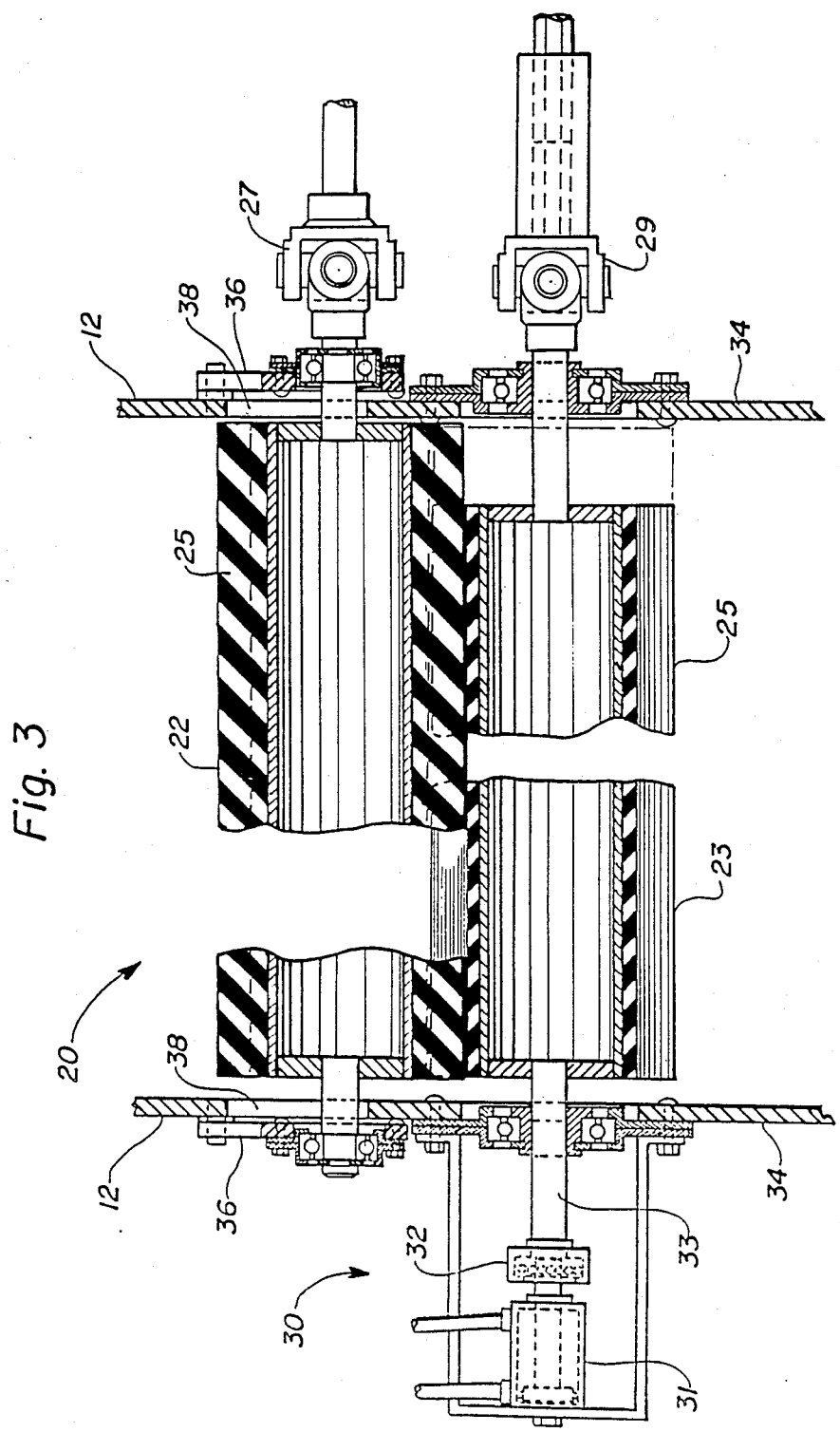
FIG. 3 is a partial cross-sectional view taken along lines 3—3 of FIG. 2 through the conditioning mechanism to show one embodiment of the reciprocating conditioning roll structure, each conditioning roll having the center portion broken away to facilitate the drawing thereof, the transverse reciprocal movement of the lower conditioning roll being shown in phantom.
Figure 4:
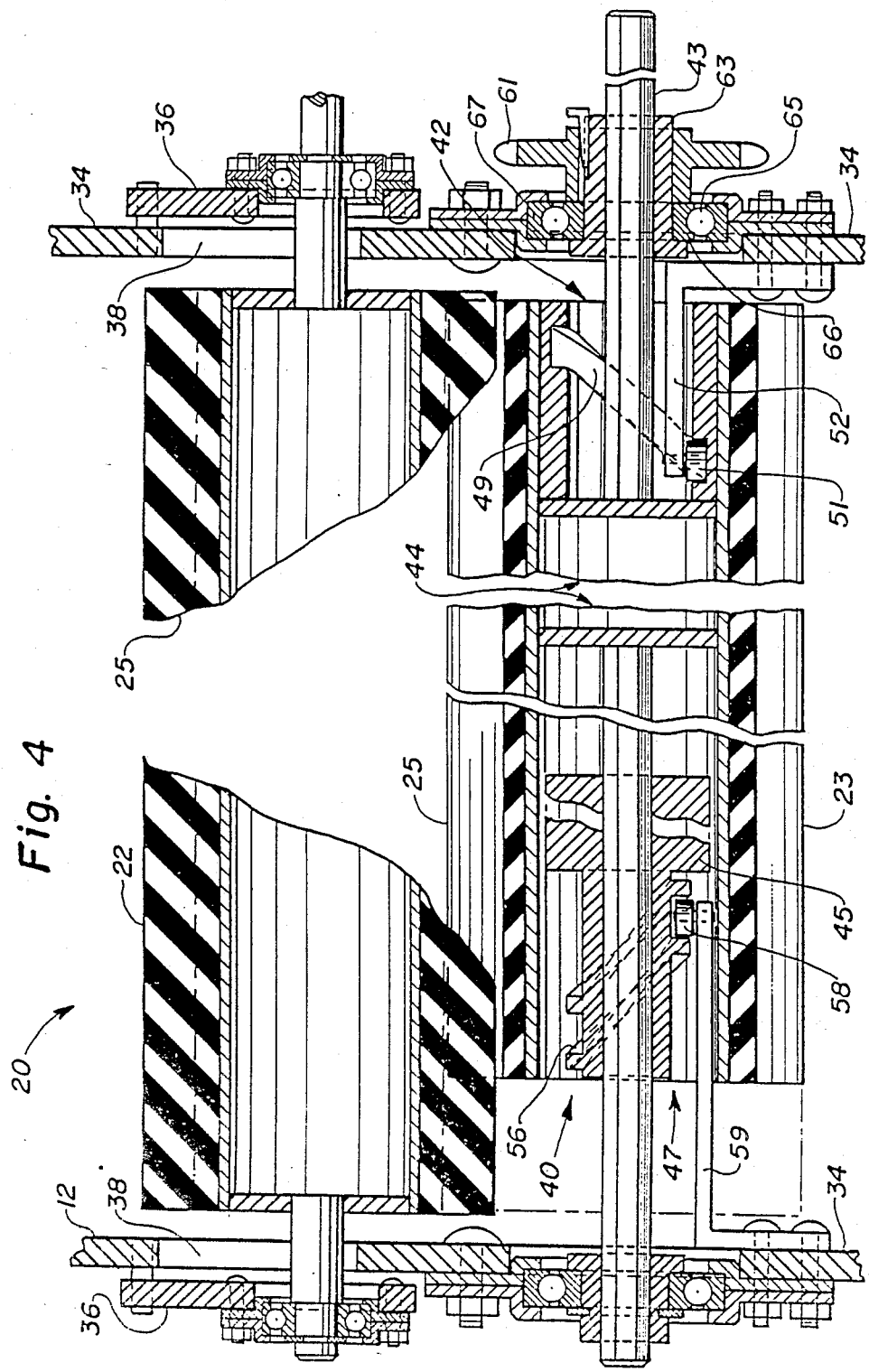
FIG. 4 is a partial cross-sectional view similar to that shown in FIG. 3 to depict a second embodiment of the reciprocating conditioning roll structure utilizing a counterweight, the transverse reciprocal movement of the lower conditioning roll being shown in phantom.

Referring now to FIG. 4, an alternative embodiment of the conditioning mechanism 20 can be seen. Similarly to the embodiment discussed in FIG. 3, only the lower conditioning roll 23 is reciprocated transversely and the upper conditioning roll 22 is mounted for conventional vertical movement relative to the lower conditioning roll 23. The oscillating mechanism 40, however, is in the form of a cam mechanism 42 operably associated with the lower conditioning roll 23 to effect the transverse linear movement of the lower conditioning roll 23 when the conditioning roll 23 is rotated by the drive mechanism 19 as depicted associated with a hex shaft 43 protruding outwardly from either end of the lower conditioning roll 23, as will be described in greater detail below. The lower conditioning roll 23 is provided with a hollow core 44 in which is located the oscillating mechanism 40 and a counterweight structure 45. The oscillating mechanism 40 also includes a second cam mechanism 47 operable to effect a transversely linear reciprocating movement of the counterweight 45 in opposition to the transverse movement of the lower conditioning roll 23 to provide a counterbalance and improve stability for the mower-conditioner 10.

Each of the cam mechanisms 42, 47 depicted in FIG. 4 includes a cam track 49, 56 inclined relative to the transversely extending axis of the lower conditioning roll 23. Each cam mechanism 42, 47 is also provided with a cam roller 51, 58 which is secured on a support arm 52, 59 attached rigidly to the respective side sheet 34 the frame 12 and engaged with the corresponding cam track 49, 56. The first cam mechanism 42 is shown with the cam track 49 affixed to the internal circumference of the core 44 of the lower roll 23. Since the cam roller 51 is fixed relative to the right side sheet 34 and since the entire lower roll 23 is mounted for movement transversely relative to the side sheet 34, the engagement between the cam roller 51 within the cam track 49 causes the transverse linear movement Of the lower conditioning roll 23 when the lower conditioning roll 23 is rotated by the drive mechanism 19. The length of the stroke of reciprocating movement of the lower conditioning roll 23 is determined by the angle of inclination of the cam track 49 relative to the axis of the conditioning roll.

The counterweight mechanism 45 is slidably mounted on the hex shaft 43 to be rotatable therewith while permissive of transverse movement relative to the lower conditioning roll 23. The counterweight mechanism 45 is provided with a cam track 56 built-in. The angle of inclination of the cam track 56 is equal to, but opposite of, the angle of inclination of the cam track 49 of the first cam mechanism 42. Similar to the first cam mechanism 2, the second cam mechanism 47 is provided with a cam roller 58 mounted on a support arm 59 rigidly secured to the left side sheet 34 so that the distance between the cam roller 58 and the left side sheet 34 is fixed. When the counterweight mechanism 45 is rotated with the hex shaft 43 and the lower conditioning roll 23, the engagement between the cam roller 58 and the cam track 56 effect a linearly transverse movement of the counterweight mechanism 45 along the hex shaft 43 in opposition to the transverse movement of the lower conditioning roll 23. Since the mass of the counterweight mechanism 45 is substantially equal to the mass of the lower conditioning roll 23, the oppositely moving masses of the counterweight 45 and the lower conditioning roll 23 counterbalance. One skilled in the art will readily realize that other cam mechanism configurations or wobble devices would be equally applicable and equally effective to cause an opposing transverse movement of the counterweight 45 and lower conditioning roll 23.

Continuing with reference to FIG. 4, the bearing mechanism for rotatably supporting the lower conditioning roll 23 for transverse reciprocal movement can best be seen. Rotational power to the lower conditioning roll 23 could be provided by a chain drive mechanism which would include a sprocket 61 cooperable therewith. A hex bore bushing support hub 63 is mounted on the hex shaft 43 to be rotatable therewith. The hex bore bushing 63 is pressed into the inner race 66 of a ball bearing 65 whose outer race is secured to the side sheet 34 of the frame 12. As a result, the hex bore bushing 63 and hex shaft 43 are rotatably supported within the side sheet 34. The hex bore bushing 63 has an antifriction internal surface and provides a bushing area for the transverse linear reciprocating movement of the hex shaft 43. By incorporating the chain sprocket 61 into the body of the hex bore bushing 63, rotational drive imparted to the chain sprocket 61 by a drive chain (no shown) will be transferred directly to the hex shaft 43 to effect a rotative movement of the lower conditioning roll 23. Accordingly, a low cost bearing surface capable of accommodating both rotational and linearly reciprocating movement is provided.

Figure 5:
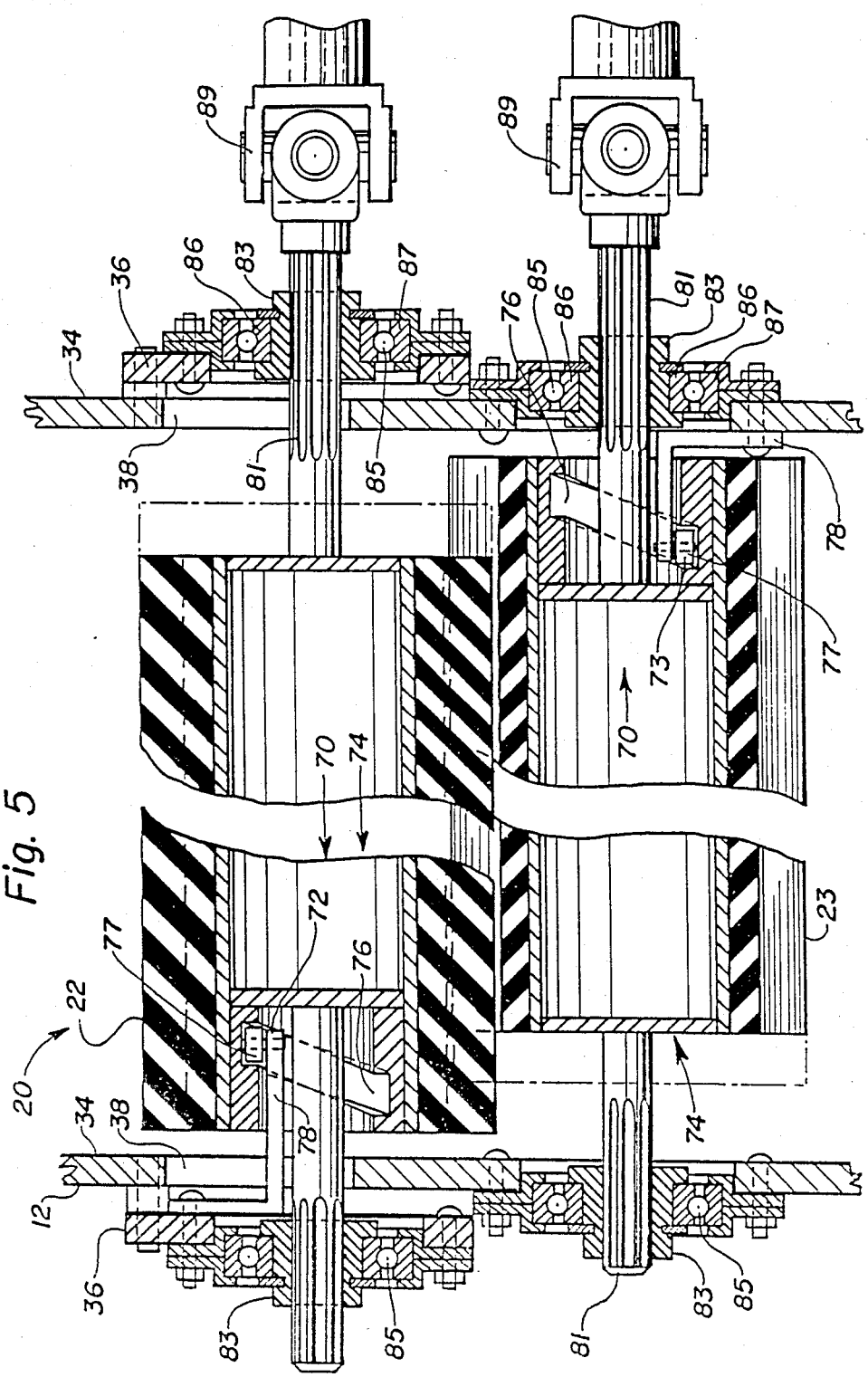
FIG. 5 is a partial cross-sectional view similar t that shown in FIG. 4 to depict a third embodiment of the reciprocating conditioning roll structure with both conditioning rolls being mounted for transverse reciprocal movement as shown in phantom.

Referring now to FIG. 5, a third embodiment of the reciprocating conditioning roll mechanism 20 can best be seen. Contrary to the embodiments described above relative to FIGS. 3 and 4, both the upper conditioning roll 22 and the lower conditioning roll 23 are reciprocated transversely relative to one another. The oscillating mechanism 70 is shown in the form of a cam mechanism 72 operatively associated with the upper conditioning roll 22 and a second cam mechanism 73 operatively associated with the lower conditioner roll 23. As noted above with respect to the oscillating mechanism 40, the first and second cam mechanisms 72, 73 include an inclined cam track 76 and an associated cam roller 77 mounted on support arm 78 affixed to the respective side sheets 34 to provide reciprocal movement to the respective conditioning rolls 22, 23.

Because both the upper conditioning roll 22 and the lower conditioning roll 23 are being reciprocated equally, the angle of inclination of the cam track 76 is equal in both the cam mechanism 72, 73, but is only half of the angle of inclination required in the embodiment depicted in FIG. 4 to effect an identical amount of relative reciprocal movement. As described above with respect to the embodiment shown in FIG. 4, the cam mechanisms 72, 73 are housed within the core 74 of the conditioning rolls 22, 23. Because of the counterrotation of the respective rolls 22, 23, the angle of inclination of the cam track 76 on the cam mechanism 72, 73 is essentially identical but effect opposing reciprocating movement of the respective conditioning rolls 22, 23.

It would be preferable to place the cam track 76 on the cam mechanism 72 slightly out of phase with the cam track 76 of the cam mechanism 73 so that the reciprocal movement of the respective conditioning rolls 22, 23 is not exactly opposing, although nearly so. This out of phase alignment of the respective cam mechanism 72, 73 would result in a continuous relative reciprocal movement of the conditioning mechanism 20, as compared to the dead spot encountered when the conditioning rolls 22,23 would reach the limit of reciprocation simultaneously if they were in phase.

FIG. 5 also depicts an alternative bearing arrangement for accommodating both rotational and reciprocal movements of the conditioning rolls 22, 23. Compared with the embodiment described above relative to FIG. 4, the shafts 81 corresponding to the respective conditioning rolls 22, 23 are splined and are slidably received within the splined corresponding bore of a bushing or support hub 83 rotatably mounted within the inner race 86 of a ball bearing 85 whose outer race 87 is secured to the applicable side sheet 34 of the frame 12. As a result, the bushing 83 is rotatable with the splined shaft 81 but, because of an antifriction internal surface engaged with the shafts 81 as described above relative to the support hub 63, also permits relative linear movement therebetween. Rotational power can be provided to the respective shafts 81 from the drive mechanism 19 coupled thereto with telescopic universal joint drive couplings 89.

Because of the need to provide generally vertical movement of the upper conditioning roll 22 relative to the lower conditioning roll 23, as described relative to the embodiment shown in FIG. 3 above, the bearings 85 and associated bushings 83 for the upper roll 22 must be carried by the respective swing arms 36 to facilitate the vertical movement while the upper conditioning roll 22 is being transversely reciprocated. Since the drive 19 is timed to the respective conditioning rolls 22, 23, the reengagement of the upper conditioning roll 22 with the lower conditioning roll 23 will be accomplished in proper intermeshing relationship.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts as based upon the description may be employed in other embodiments without departing from the scope of the invention. Accordingly, the following claims are intended to protect the invention broadly as well as in the specific form shown.

Having thus described the invention, what is claimed is:

1. In a harvesting machine having a mobile frame adapted for movement over a field to harvest crop material from the field; a crop harvesting header supported from said frame to collect crop material from the field and convey the collected crop material for further harvesting action; a conditioning mechanism positioned in flow communication with said crop harvesting header to receive said collect crop material therefrom and effect a conditioning thereof, said conditioning mechanism including a pair of counter-rotating conditioning rolls operable to condition crop material passing therebetween; and drive means operatively connected to said crop harvesting header and said conditioning mechanism to operatively power the operation thereof, the improvement comprising:
  bearing means for rotatably supporting at least one of said conditioning rolls, said bearing means being supported from said frame and being adapted to permit a reciprocating linear motion of said at least one conditioning roll; and
  oscillating means operatively connected to said at least one conditioning roll to effect a reciprocating transverse linear movement thereof.

2. The harvesting machine of claim 1 wherein said bearing means includes an outer race fixedly supported by said frame; an inner race rotatably supported from said outer race and rotatable relative thereto; and a support hub fixed to said inner race to be rotatable therewith, said support hub mounting said at least one conditioner roll and permitting linear movement of said at least one conditioning roll relative thereto.

3. The harvesting machine of claim 2 wherein said at least one conditioning roll has an axially aligned shaft, said support hub receiving said shaft to permit linear movement of said shaft relative thereto.

4. The harvesting machine of claim 3 wherein said shaft has a configuration preventing rotative movement thereof relative to said support hub.

5. The harvesting machine of claim 4 wherein said shaft has a hexagonal cross-sectional configuration corresponding to a hexagonal bore though said support hub.

6. The harvesting machine of claim 4 wherein said shaft is provided with splines corresponding to a ribbed bore through said support hub.

7. The harvesting machine of claim 4 wherein said support hub is pressed into said inner race so as to be rotatable therewith.

8. The harvesting machine of claim 7 wherein said support hub has an anti-friction bore receiving said shaft so that said shaft is linearly movable relative thereto while being rotatable therewith.

9. The harvesting machine of claim 8 wherein said support hub has a drive sprocket secured thereto and operatively associated with said drive means to effect rotation of said at least one conditioning roll.

10. A mechanism for mounting a conditioning roll in a crop harvesting machine to permit a rotative movement of said conditioning roll and a linear reciprocating movement of said conditioning roll comprising:
  a bearing having a fixed outer race and a rotatable inner race to rotatably support said conditioner roll; and
  a support hub fixed to said inner race to be rotatable therewith, said support hub having a bore therethrough to receive a mounting shaft connected to said conditioning roll, said support hub having an anti-friction surface in said bore to permit a linear movement of said mounting shaft relative to said support hub, said mounting shaft being operatively connected to means for linearly reciprocating said conditioning roll so that said mounting shaft is linearly movable relative to said support hub.

11. The mounting mechanism of claim 10 wherein said mounting shaft has a configuration corresponding to said support hub bore such that said mounting shaft is rotatable with said support hub and said inner race.

12. The mounting mechanism of claim 11 wherein said mounting shaft has a hexagonal cross-sectional configuration corresponding to a hexagonally shaped support hub bore.

13. The mounting mechanism of claim 11 wherein said mounting shaft is splined to correspond to a ribbed support hub bore so that said mounting shaft is rotatable with said support hub.

14. The mounting mechanism of claim 11 wherein said support hub is pressed into inner race.

15. The mounting mechanism of claim 14 wherein said support hub has a drive apparatus affixed thereto for effecting a rotational driving of said conditioning roll.

* * * * *